Jan. 24, 1967 D. WAHLER 3,300,134
THERMOSTATIC CONTROL VALVE
Filed Oct. 20, 1964 5 Sheets-Sheet 1

INVENTOR
DIETER WAHLER
BY Dicke + Craig
ATTORNEYS

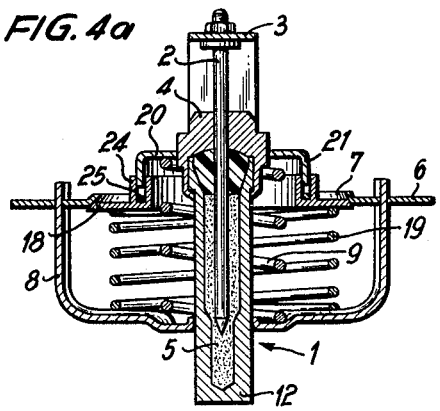
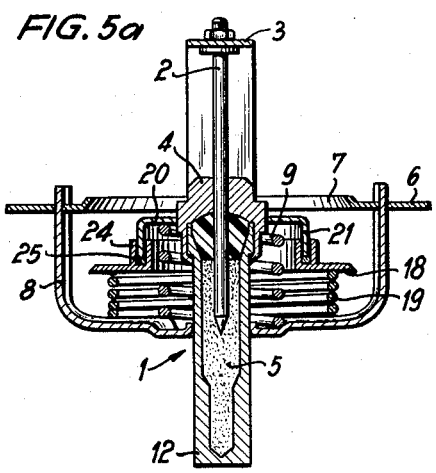
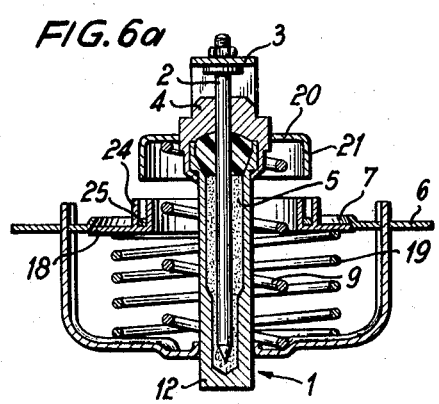

Jan. 24, 1967     D. WAHLER     3,300,134
THERMOSTATIC CONTROL VALVE
Filed Oct. 20, 1964     5 Sheets-Sheet 4

INVENTOR
DIETER WAHLER
BY Dicke + Craig
ATTORNEYS

United States Patent Office 3,300,134
Patented Jan. 24, 1967

3,300,134
THERMOSTATIC CONTROL VALVE
Dieter Wahler, Esslingen am Neckar, Germany, assignor to Gustav Wahler, Esslingen am Neckar, Germany
Filed Oct. 20, 1964, Ser. No. 405,177
Claims priority, application Germany, Oct. 23, 1963, W 35,492
8 Claims. (Cl. 236—34)

The present invention relates to a thermostatic control valve for regulating and controlling the flow of a fluid in accordance with the temperature thereof, for example, the flow of the cooling water for the engine of an automobile, and more particularly it relates to a control valve of such a type which is provided with a feeler element which is filled with a thermally expansible material, for example, wax, and with a pin which projects into this feeler element and the material therein, and further with a return spring which acts either upon the feeler element or the pin and closes the valve when the temperature of the fluid decreases, while when the temperature increases due to the expansion of the material in the feeler element, the valve is opened and the return spring is thereby tightened.

In the known kinds of thermostatic control valves of the type as above described, the feeler element is usually not filled completely with the thermally expansible material so as to insure that the valve will open accurately to a predetermined position. When the temperature of the fluid the flow of which is to be controlled increases and the expansible material in the feeler element then starts to expand, it will at first fill out the empty space in the feeler element before it produces a movement for opening the valve.

In actual practice it has been found that, even though the feeler element is closed and the inlet opening for the feeler pin is tightly sealed, some of the expansible material may leak out of the feeler element so that, when the fluid to be controlled increases in temperature, the valve will either react too late or not at all and may therefore heat up unduly or even excessively.

It is an object of the present invention to overcome this disadvantage of the known thermostatic control valves of the type as described above and to insure that such a valve will open automatically even when a leakage of the thermally expansible material occurs from the feeler element. For attaining this object, the control valve according to the invention is designed in such a manner that the spring means which acts upon the part of the valve which is movable by the expansion and contraction of the material within the feeler element and which are compressed when the valve is opened as a result of an increase in temperature of the fluid to be controlled, will not only maintain the valve in the closed position when the fluid has a low temperature, but will also open the valve when some of the expansible material is lost from the feeler element due to leakage.

One feature of the invention consists in providing the movable valve member which is connected to the feeler element in the form of a slide valve which, when the temperature of the fluid which is to be controlled increases, is moved by the feeler element in one direction so as to open the valve opening and at the same time to compress the return spring, while when some of the expansible material is lost from the feeler element, this slide valve is moved by the expanding return spring in the opposite direction and beyond its closing position. The valve opening will therefore also in this event be uncovered and the fluid to be controlled cannot be heated excessively because the valve has become defective by a leakage of the expansible material.

Although it is necessary to provide a sufficient clearance between the outer wall surface of the slide valve and the inner surface of the wall of the valve opening to permit the slide valve to move with relatively little friction, this clearance which prevents the valve from closing tightly is so small that in most cases it has no effect upon a proper regulation of the flow of the fluid which is to be controlled, for example, of the cooling water for an engine of an automobile. However, there are other cases in which such a thermostatic control valve should close so tightly that a slide valve cannot be employed. In this event, the control valve according to the invention may be modified by providing it with a valve ring which at low temperatures of the fluid to be controlled closes the valve opening completely by being pressed by a compression spring against an annular valve seat surrounding the opening, while above the valve ring an additional plate-shaped or cup-shaped closure member is provided which is secured to the movable part of the valve, i.e. to the feeler element or the feeler pin. When the temperature of the fluid to be controlled increases and thereby causes the expansible material in the feeler element to expand, the outer edge portion or the rim of this additional closure member will be pressed upon the valve ring so that the latter opens the valve opening. If any leakage of expansible material from the feeler element occurs, this additional closure member will be lifted off the valve ring by the action of an additional compression spring so that, even though the valve ring still closes the valve seat around the valve opening, the fluid can flow through the valve by passing through the central opening of the valve ring.

The valve ring therefore tightly closes the valve seat around the valve opening as long as the feeler element contains a sufficient amount of expansible material so that the central opening of this valve ring will remain closed by the additional closure member. In order to attain a tight sealing action between the additional closure member and the central opening of the valve ring, this closure member may be provided with a suitable sealing element which during the normal operation of the valve engages tightly with the surface of the valve ring and is lifted therefrom only when the additional closure member is lifted because of a loss of expansible material from the feeler element. Of course, these sealing means may be of any desired construction. Thus, for example, it is also possible to provide the valve ring with a pair of coaxial annular projections between which the rim of the cup-shaped closure member may engage in a manner similarly as in a labyrinth packing and may in addition engage upon a gasket which is inserted between these projections.

If the thermostatic control valve according to the invention has been opened at low temperatures because of a leakage of expansible material from the feeler element, there is still a possibility that, when the fluid to be controlled is heated to a high temperature, the amount of material remaining in the feeler element may expand so much as to cause the valve again to close so that the temperature of the fluid may then become excessive. It is therefore another object of the invention also to avoid the occurrence of this possibility by providing the valve with suitable means for locking it in the particular open position to which it has been moved as the result of a leakage of expansible material from the feeler element. Consequently, as soon as the valve has been moved to this open position, it can no longer close and the circulation of the fluid to be controlled, for example, the cooling water of an engine, can no longer be interrupted and the fluid will therefore not be heated excessively.

This object may be attained in a very simple manner by providing the movable part of the valve with a locking device which does not interfere with the normal movements of the valve and will only become operative when the valve opens as the result of a loss of expansible material from the feeler element.

The various features and advantages of the present invention will become more clearly apparent from the following detailed description thereof which is to be read with reference to the accompanying drawings, in which—

Figure 4:
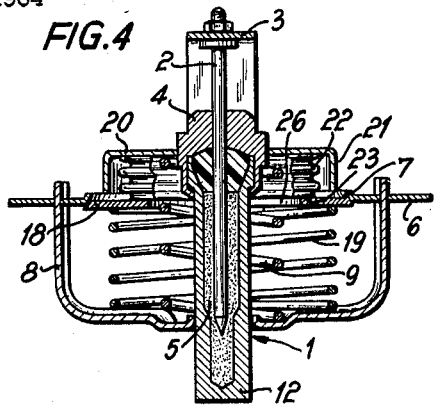
Figure 5:
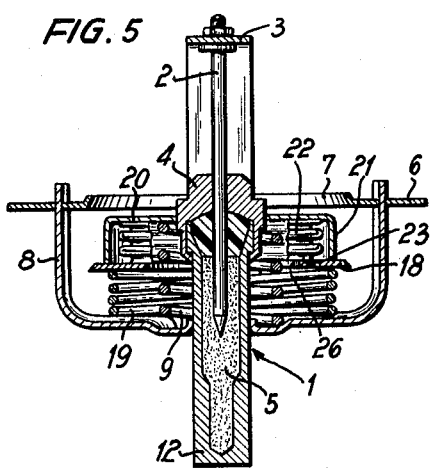
Figure 6:
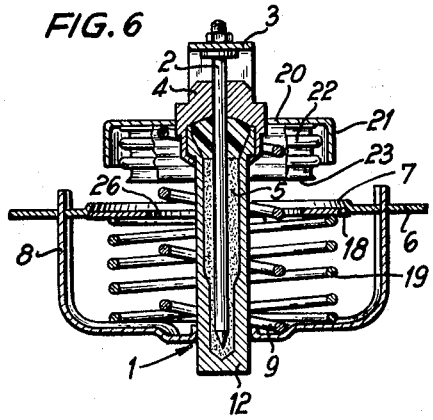
Figure 7:
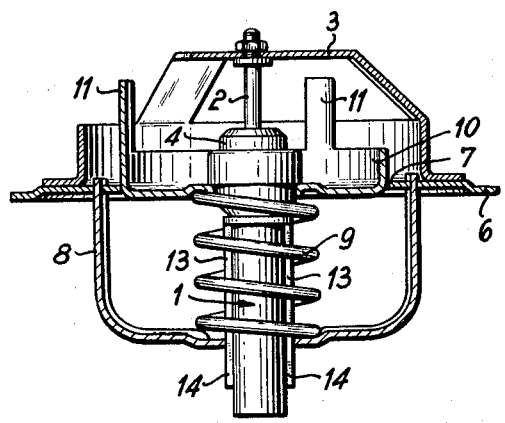
Figure 8:
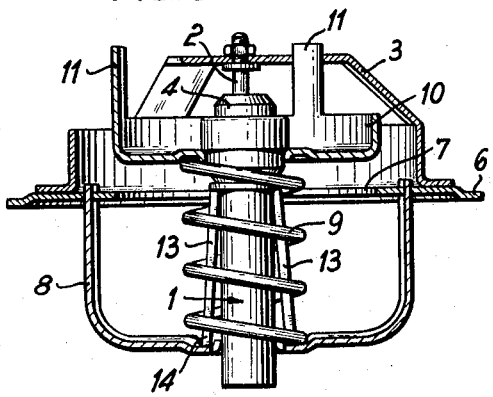
Figure 9:
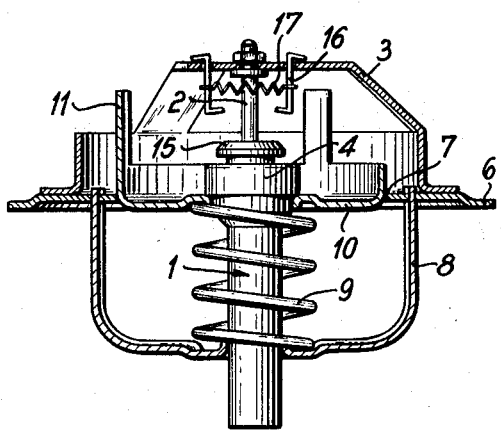
Figure 10:
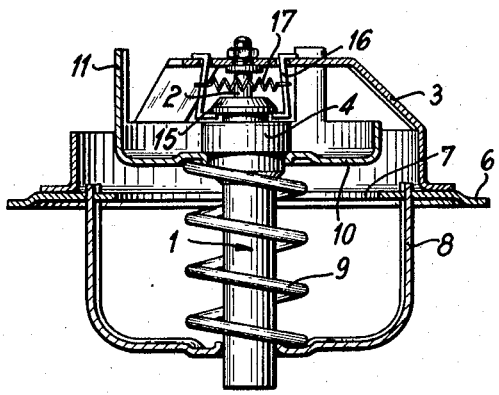

FIGURES 4 and 4a small respectively show cross sections of two modifications of the valve according to the invention at the right and left of the vertical center line and both in the closed position of each valve at low temperatures;

FIGURES 5 and 5a show the valves according to FIGURES 4 and 4a in the open position at high temperatures;

FIGURES 6 and 6a show the valves according to FIGURES 4 and 4a in the open position at the occurrence of a leakage of expansible material from the feeler element;

FIGURE 7 shows a cross section of a valve according to another modification of the invention in the closed position at low temperatures;

FIGURE 8 shows the valve according to FIGURE 7 in the open locked position at the occurrence of a leakage of expansible material from the feeler element;

FIGURE 9 shows a cross section of a valve according to a further modification of the invention in the closed position at low temperatures; while FIGURE 10 shows the valve according to FIGURE 9 in the open locked position corresponding to the position as shown in FIGURE 8.

Figure 1:
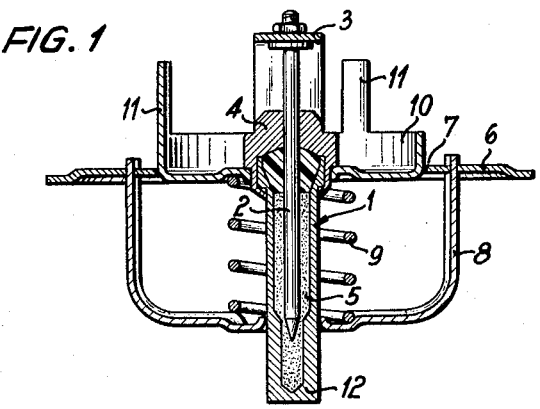
FIGURE 1 shows a cross section of the valve according to the invention in the closed position at low temperatures.
Figure 2:
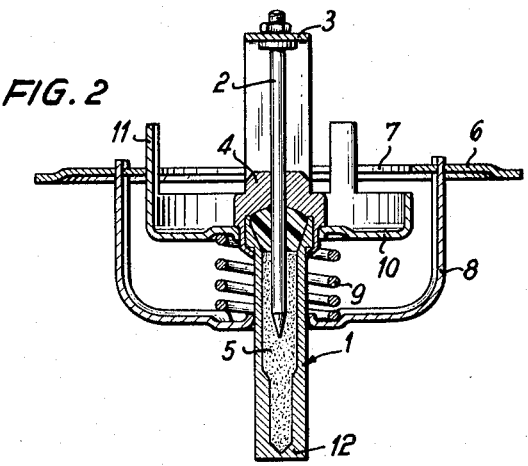
FIGURE 2 shows the same valve in the open position at high temperatures.
Figure 3:
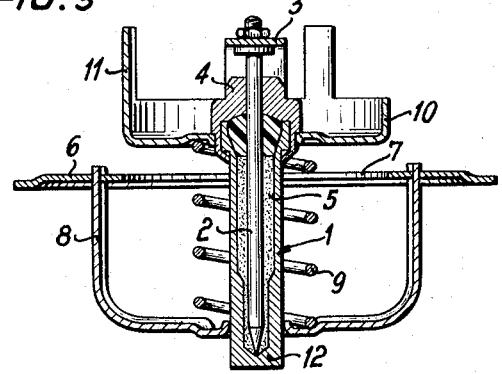
FIGURE 3 shows the same valve in the open position to which it is moved when some of the expansible material has leaked out of the feeler element.

Referring first to FIGURES 1 to 3 of the drawings, the tubular feeler element 1 of the thermostatic control valve according to the invention which has a closed bottom 12 is originally filled completely with a thermally expansible material 5 and is closed at its upper end by a stuffing box 4 or the like of any suitable construction through which the feeler pin 2 which is secured at its outer end, for example, on a stationary bracket 3 extends into the feeler element 1 and the material 5 therein.

The feeler element 1 is slidable within and guided by a guide member 8 which may consist, for example, of a bracket as shown or of a cup which is provided with an inlet opening for the flow of the fluid which is to be controlled, for example, the cooling water for the engine of an automobile. Guide member 8 is secured to a valve plate 6 which is mounted within the cooling line and supports the entire valve and also has a central aperture which serves as the valve opening 7. Guide member 8 also serves as the fixed support of a return spring 9 which surrounds the feeler element 1 and acts upon a cup-shaped valve member 10 which is rigidly connected to the feeler element 1 and adapted to operate as a slide valve to open and close the valve opening 7. The wall of valve member 10 is provided with guiding extensions 11 for maintaining it in alignment with the valve opening 7 when the valve is opened so that during the closing movement the actual valve part of the valve member 10 will properly reenter the valve opening 7 and thereby close the latter.

During the assembly of the valve, the feeler element 1 is filled completely with the thermally expansible material 5 at a low temperature. The height of the wall of valve member 10 then determines the extent of its movement unit it opens the valve opening 7. By this movement, the valve member also compresses the return spring 9 and tightens it. In the position of the valve as shown in FIGURE 1, the valve opening 7 is closed so that no coolant can flow in the upward direction through the valve.

When the temperature of the fluid to be controlled increases, it also increases the temperature of the feeler element 1 so that the material 5 therein expands. The feeler element 1 as seen in the drawings is thereby moved downwardly and takes along the valve member 10 which compresses the return spring 9 and opens the valve opening 7 to the position as shown in FIGURE 2, so that the coolant can flow freely through the valve.

When the temperature of the fluid then decreases, the expansible material 5 again contracts. The return spring 9 then moves the valve member 10 and the feeler element 1 back to the original position so that the valve is again closed. The valve opening 7 is therefore either closed or opened automatically to different extents depending upon the particular temperature of the fluid which acts upon the feeler element 1.

If for any reason some of the thermally expansible material 5 should be lost, for example, through porous points in the wall of the feeler element 1 or by leakage through the stuffing box 4, the remainder of the material 5 in the feeler element 1 will still expand when the temperature increases. However, this expansion will be no longer sufficient to compress the return spring 9 as required. The valve will therefore either not open at all or at least not to the extent which would be in accordance with the temperature of the fluid which is to be controlled. Consequently, the flow of fluid through the valve will be either stopped entirely regardless of how high the tmperature of the fluid might be in or in any event it will be restricted by the valve and will therefore heat up excessively.

This disadvantage of the known thermostatic control valves of this type is overcome according to the invention by devising the new valve so as to open automatically and to remain open when a leakage of the expansible material 5 occurs from the feeler element 1. The amount of material 5 remaining in the feeler element 1 can then no longer act against the return spring 9 and the latter will fully expand and move the valve member 10 beyond its closed position. Thus, the valve member 10 will open the valve opening 7 by moving in the upward direction to the position as shown in FIGURE 3, that is, to a position which is determined by the engagement of the bottom 12 of the feeler element 1 against the tip of the feeler pin 2.

The thermostatic valve according to the invention is therefore opened automatically also even though the feeler element no longer contains sufficient thermally expansible material. It is therefore impossible that the fluid to be controlled, for example, the cooling water for the engine of an automobile, might for this reason be overheated.

It is thus clearly evident that, contrary to any similar thermostatic valve which is provided with a valve disk which always maintains the valve in the closed position not only at low temperatures but also when a leakage of the thermally expansible material occurs, the slide valve according to the invention will always insure a safe and reliable operation in simplest possible manner and without requiring any additional means or provisions. When the feeler element is completely filled with the thermally expansible material, for example, wax, the slide valve according to the invention will also carry out a sufficient preliminary movement to insure that, before the valve is opened to permit the fluid, for example, the cooling water, to circulate through the engine or other aparatus, this fluid will be warmed up to the desired minimum temperature. This movement of the slide valve also insures that the return spring will be tightened sufficiently for the normal operation of the valve.

Of course, the structural arrangement of the different parts of the valve may also be reversed without causing any change in the function of the valve by mounting the feeler element in a fixed position and by moving the feeler pin which in such a case would be connected to the slide valve which is acted upon by the return spring. This may, of course, be similarly applied also in all of the other embodiments of the invention as will hereafter be described.

Although a slide valve will close the valve opening sufficiently for most purposes, there may be cases in which an absolutely tight closing of the valve may be necessary. This may be attained very easily by modifying the valve according to the invention in the manner as illustrated in FIGURES 4 to 6 which show two different valve constructions at the right and left of the vertical center line of each drawing and also show these two valves in the same three positions as shown in FIGURES 1 to 3.

Each of these two valves according to FIGURES 4 to 6 and 4a to 6a consists just like the valve according to FIGURES 1 to 3 of a feeler element 1 which has a closed bottom 12 and is filled with a thermally expansible material 5, such as wax or the like, and of a stuffing box 4 or the like through which the feeler pin 2 extends into the feeler element 1 and the material 5 therein. This feeler pin is also secured in a fixed position on an outer bracket 3. Furthermore, the guide member 8 in which the feeler element 1 is slidable and which supports the return spring 9 is also secured to the valve plate 6 which contains the valve opening 7.

The two valve structures according to FIGURES 4 to 6 and 4a to 6a differ, however, from the valve according to FIGURES 1 to 3 by the fact that the wall around the valve opening 7 is made in the form of a valve seat and that it is not closed by a slide valve but by a valve ring 18 which at low temperatures is pressed by a compression spring 19 against the valve seat so as to close the valve opening 7. Furthermore, each of these valves is provided with a cup-shaped closure member 20 with a downwardly projecting rim 21. This closure member 20 is rigidly secured to the movable feeler element 1 and is acted upon by another compression spring which corresponds to the return spring 9 in the valve according to FIGURES 1 to 4.

When the valve according to the structure as shown at the right of the center line of FIGURES 4 to 6 and 4a to 6a is in the open position, the closure member 20 and the valve ring 18 are tightly sealed relative to each other by a bellows 22, the lower edge 23 of which rests resiliently on the valve ring 18 so that the opening 26 of valve ring 18 is closed toward the outside. In the valve structure as shown at the left of the center line, however, the valve ring 18 is provided with a pair of annular, upwardly extending coaxial projections 24 between which the rim 21 of the closure member 20 engages in a manner similar as in a labyrinth packing. If necessary, a gasket 25 may in addition be inserted upon the bottom between the annular projections 24.

At low temperatures of the fluid which is to be controlled, the valve ring 18 will be pressed tightly against the valve seat 7 by the compression spring 19, as shown in FIGURES 4 and 4a, and the opening 26 of the valve ring 18 will also be tightly closed by the closure member 20 so that no fluid can flow through the valve.

When the temperature of the fluid increases, however, the valve will be opened to the position as shown in FIGURES 5 and 5a because of the expansion of the material 5 in the feeler element 1. The movable part of the valve then moves downwardly, the edge of the rim 21 of the closure member 20 presses upon and thus also moves the valve ring 18 in the downward direction, and both springs 9 and 19 are compressed. The valve opening 7 is then fully open so that the fluid can flow freely through the valve. The opening 26 of the valve ring 18 then remains closed by the closure member 20 which has a smaller diameter than the valve opening 7. Valve ring 18 may be guided by the compression spring 19 which should then be secired to this valve ring and also to the guide member 8, for example, by being clamped thereon or welded thereto.

If a leakage of the expansible material 5 occurs, the movable part of the valve is pushed upwardly by the spring 9 which presses against the closure member 20 and then lifts the same off the valve ring 18. This also means that in the valve structure as shown in FIGURE 6 the bellows 22 is also lifted off the valve plate 18, while in the valve structure according to FIGURE 6a the rim 21 of the closure member is lifted out of the annular recess between the projections 24. In both cases the opening 26 of the valve ring 18 will thus be opened and the fluid can flow freely through the valve even through the main valve opening 7 remains closed since the compression spring 19 continues to press the valve ring 18 against the valve seat around this opening 7.

FIGURES 7 to 10 illustrate two modifications of the valve as shown in FIGURES 1 to 3, in which the valve member is provided in the form of a slide valve. However, in this case the valve member 10 is prevented from closing again after it has once been opened because of a leakage of the expansible material 5 from the feeler element 1. This is accomplished by the provision of an additional device which locks the valve member 10 in the open position after a leakage has occurred. If desired, a similar locking device may, of course, also be applied in the valve according to FIGURES 4 to 6.

In the valve as illustrated in FIGURES 7 and 8, the feeler element 1 carries on its outer side several (for example, two to four) spreader rods 13 which are connected thereto at their upper ends and extend downwardly along the outside of, and normally in engagement with the feeler element through the bottom opening of the guide member 8. At their lower ends 14, these spreader rods 13 terminate above the lower end of the feeler element 1.

When the fluid which is to be controlled increases in temperature and the expansible material in the feeler element 1 thereby expands, the feeler element will be moved downwardly so that the valve member 10 opens the valve opening 7 and compresses the return spring 9. When the temperature of the coolant decreases, the valve opening 7 is again closed automatically. The spreader rods 13 then remain continuously in engagement with the feeler element 1 by being held within their guide slots in the wall of the bottom opening of the guide member 8. The feeler element is therefore at this time not prevented from moving by the spreader rods 13.

If, however, because of a leakage of expansible material from the feeler element 1 the valve member is pressed so far upwardly by the return spring 9 that the valve opening 7 will be opened, the free ends 14 of the spreader rods 13 will slip out of the guide slots in the wall of the bottom opening of the guide member 8 and will spread outwardly from the feeler element 1 to the position as illustrated in FIGURE 8. The free ends 14 of the spreader rods 13 then rest upon the bottom of the guide member and absolutely prevent the opened valve from closing again. Thus, if the valve should ever become defective by a leakage of expansible material from the feeler element 1, there is absolutely no danger that the valve might fail to open or that it might close again after it has once been opened and that the fluid to be controlled, for example, the cooling water for an engine, might then be overheated.

In the valve according to FIGURES 9 and 10 the same effect will be attained as in the valve according to FIGURES 7 and 8 by providing locking pawls in place of spreader rods. Otherwise the two valves structurally are alike. The locking pawls 16 are pivotably mounted on the stationary bracket 3 which supports the feeler pin 2, and they consist, for example, of two or three Z-shaped hooks which are inserted and suspended in apertures in the bracket 3 and are connected to each other by a spring 17. These hooks are operatively associated with an annular locking flange 15 which has a beveled outer surface and is secured to the upper end of the stuffing box 4.

During the normal operation of the control valve according to FIGURES 9 and 10 in accordance with changes in temperature of the fluid to be controlled, the movable part of the valve will not reach the area of the locking pawls 16. If, however, the valve opens because of a leakage of the expansible material from the feeler element 1, and the return spring 9 is fully expanded, the feeler element 1 is moved so far upwardly that the beveled surfaces of the locking flange 15 engage against and slide along the inner edges of the lower ends of the locking pawls 16 and thereby pivot the latter away from each other until the lower edge of the locking flange 15 passes over the upper edges of these ends of the locking pawls which due to the action of the spring 17 will then snap into the annular recess underneath the locking flange 15 and thereby lock the feeler element 1 together with the valve member 10 in the elevated position and thus prevent the valve from closing.

The means for locking the movable part of the valve in the elevated position so that the valve cannot close again after it has once opened because of a leakage of expansible material from the feeler element 1 may, of course, also be made of any suitable types of construction other than those as illustrated in FIGURES 7 to 10.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A thermostatic control valve for the control of a fluid, comprising a feeler unit having two parts consisting of a tubular feeler element with a closed end and completely filled with a quantity of thermally expansible material subject to diminution by accidental loss thereof, said material being subject to the assumption of a contracted, solid state thereof in response to a predetermined low temperature of said fluid, said material being further subject to the assumption of an expanded liquid state in response to an increase of temperature of said fluid above said predetermined low temperature, and a feeler pin projecting into said feeler element and surrounded for a substantial portion of its length by said thermally expansible material, a stationary mounting plate having a valve opening therein, means for fixedly securing said feeler pin relative to said mounting plate, valve means fixedly secured to said feeler element and movable therewith, said valve means being adapted to open and close said valve opening, spring means operatively connected to said valve means and to said feeler element, said spring means exerting a force tending to move said valve means and said feeler element in one direction from a closed position of said valve means to an open position, the mutual coaction of said feeler pin and of said expansible material in said contracted solid state being effective to neutralize said force and thereby to maintain said valve means in said closed position, the mutual coaction of said feeler pin and said expansible material in said expanded liquid state thereof in response to said increase of temperature of said fluid being effective to move said feeler element and said valve means in a direction opposite to said one direction to said open position and compress said spring means, said spring means being effective to move said valve means in said opposite direction to return said valve means to said closed position upon a return of said expansible material to its contracted solid condition in response to the return of said fluid to said predetermined low temperature, said spring means being further effective to move said valve means in said opposite direction beyond said closed position to an extent such as to open said valve opening upon said diminution of said quantity of said thermally expansible material by said accidental loss and the consequent diminution of said mutual coaction of said feeler pin and said expansible material.

2. A thermostatic control valve as defined in claim 1, wherein said valve opening comprises a valve seat, said spring means comprising a pair of compression springs, said valve means comprising a valve ring which at low temperatures of said fluid is pressed by the first of said springs against said valve seat so as to close said valve opening, said valve means further comprising a closure member mounted above said valve ring on said movable part of said feeler unit and pressing upon said valve ring against the action of the second of said springs so as to open said valve opening when said fluid increases in temperature, said closure member being lifted off said valve ring and thereby opening the central opening of said ring so that said fluid can flow through said valve when some of said expansible material is lost from said feeler element.

3. A thermostatic control valve as defined in claim 2, further comprising a resilient sealing element connected to said closure member for sealing said member to said valve ring during the normal operation of said valve, said sealing element being lifted by said closure member off said valve ring so as to open the central opening of said ring when some of said expansible material is lost from said feeler element.

4. A thermostatic control valve as defined in claim 3, wherein said resilient sealing element consists of a bellows.

5. A thermostatic control valve as defined in claim 2, wherein said closure member is cup-shaped having a downwardly projecting rim, said valve ring having a pair of coaxial annular projections of different diameters, said rim engaging into the space between said projections similarly as in a labyrinth packing so as to close the central opening of said valve ring during the normal operation of the valve, said closure member being lifted off said valve ring and out of the space between said annular projections and thereby opening said central opening of said valve ring when some of said expansible material is lost from said feeler element.

6. A thermostatic control valve as defined in claim 1, further comprising locking means on said tubular feeler element for preventing said valve means from again closing said valve opening after said valve means have once opened said valve opening because of a loss of some of said expansible material from said feeler element.

7. A thermostatic control valve as defined in claim 6, further comprising a stationary guide member for guiding said tubular feeler element, said locking means comprising a plurality of spreading members connected at one of their ends to said tubular feeler element and during the normal operation of said valve extending along said feeler element and together with said element through said guide member, the other ends of said spreading members being adapted to spread laterally away from said feeler element and to rest upon said guide member at the end of the movement of said movable part when the valve has been opened because of said loss of some of said expansible material from said feeler element.

8. A thermostatic control valve as defined in claim 6, wherein said means for securing said feeler pin comprise a stationary bracket, said locking means comprising a plurality of locking pawls pivotably suspended on said bracket and having hook-shaped lower ends projecting toward but spaced from each other, and spring means tending to draw said ends toward each other, and an annular flange on said tubular feeler element having a beveled outer surface adapted to engage between said hook-shaped ends to pivot them away from each other near the end of the upward movement of said tubular feeler element caused by said loss of some of said expansible material until at the end of said upward movement said hook-shaped ends snap underneath said flange.

References Cited by the Examiner

UNITED STATES PATENTS

| | | | |
|---|---|---|---|
| 1,434,542 | 11/1922 | Horne | 236—99 |
| 1,752,116 | 2/1930 | Smith | 236—34.5 |
| 2,769,597 | 11/1956 | Mayo | 236—34 |
| 2,842,317 | 7/1958 | Wood | 236—34 |
| 2,891,730 | 6/1959 | Wood et al. | 236—34 |
| 3,128,043 | 4/1964 | Feinberg | 236—93 |

EDWARD J. MICHAEL, *Primary Examiner.*